US006920409B2

(12) United States Patent
Essam

(10) Patent No.: US 6,920,409 B2
(45) Date of Patent: Jul. 19, 2005

(54) APPARATUS FOR TESTING OPERATION OF AN EMERGENCY VALVE

(75) Inventor: Derek Mark Essam, Eastbourne (GB)

(73) Assignee: Drallim Industries Limited, East Sussex (GB)

( * ) Notice: Subject to any disclaimer, the term of this patent is extended or adjusted under 35 U.S.C. 154(b) by 0 days.

(21) Appl. No.: 10/467,465

(22) PCT Filed: Jan. 18, 2002

(86) PCT No.: PCT/GB02/00216

§ 371 (c)(1),
(2), (4) Date: Dec. 22, 2003

(87) PCT Pub. No.: WO02/063192

PCT Pub. Date: Aug. 15, 2002

(65) Prior Publication Data

US 2004/0093173 A1 May 13, 2004

(30) Foreign Application Priority Data

Feb. 7, 2001 (GB) .............................. 0103063

(51) Int. Cl.⁷ .............................................. G06F 19/00
(52) U.S. Cl. ...................................... 702/114; 702/113
(58) Field of Search .................... 137/52, 560; 73/1.01; 702/1.02, 290, 865.9, 33, 50, 51, 108, 113, 114, 127, 182, 183

(56) References Cited

U.S. PATENT DOCUMENTS

| 3,485,082 | A | * | 12/1969 | Myers ......................... 73/1.72 |
| 4,951,224 | A | * | 8/1990 | Hokynar ....................... 702/47 |
| 5,048,329 | A | | 9/1991 | Marchini |
| 5,665,898 | A | * | 9/1997 | Smith et al. .................. 73/1.72 |
| 5,748,469 | A | * | 5/1998 | Pyotsia ......................... 700/30 |
| 5,751,606 | A | | 5/1998 | Migachyov et al. |
| 6,089,269 | A | * | 7/2000 | Essam .................... 137/624.15 |
| 6,591,201 | B1 | * | 7/2003 | Hyde ........................... 702/45 |
| 6,722,383 | B2 | * | 4/2004 | Summers et al. .............. 137/1 |
| 6,795,780 | B1 | * | 9/2004 | Hyde ........................... 702/45 |

FOREIGN PATENT DOCUMENTS

| DE | 3638844 | | 5/1988 | |
| DE | 3638844 A1 | * | 5/1988 | ........... F16K/31/04 |
| DE | 3837882 A1 | * | 5/1989 | ........... G01M/13/00 |
| GB | 2332939 | | 7/1999 | |
| GB | 2332939 A | * | 7/1999 | ........... F16K/37/00 |
| GB | 2346672 | | 8/2000 | |
| GB | 2346672 A | * | 8/2000 | ........... F16K/37/00 |

* cited by examiner

Primary Examiner—John Barlow
Assistant Examiner—Douglas N Washburn
(74) Attorney, Agent, or Firm—Dowell & Dowell, P.C.

(57) ABSTRACT

Apparatus for testing an emergency valve in which a valve member (10) is movable by fluid-operated actuator (11) between a normal (open or closed) position and an emergency position (closed or open respectively). The apparatus comprises partial stroking means including means (32, 23, 22 to 13) for initiating emergency movement of the valve from its normal towards its emergency position, and means (13, 14) for returning it from a predetermined position intermediate the normal and emergency positions at its normal operating speed. The apparatus includes means for detecting the loss of the controlling electrical signal to the valve and a means (51) for detecting the correct operation of the valve and its associated operating components by measuring the pressure of fluid being released from or being applied to the actuator (11).

17 Claims, 3 Drawing Sheets

APPARATUS FOR TESTING OPERATION OF AN EMERGENCY VALVE

The present invention relates to means for testing operation of an emergency valve such as an emergency shut down or isolation valve where, in emergency, the valve closes or an emergency blow-down valve where, in emergency, the valve opens.

The invention will be described with particular reference to emergency shut down valves which are used, for example, in processing industries such as oil refineries or oil rigs, the valve being provided in a pipeline, the arrangement being such that in the event of an emergency, the valve will close. However, the emergency valve may be an emergency isolation valve, which, in an emergency, shuts down and isolates part of a process or an emergency blow down valve which, in an emergency, opens to pass air or other fluid to, for example, blow down the process.

Reference may be made to the following products: Metso Automation, Neles ValveGuard: Emerson Process Management, Fisher Rosemount DVC. 600:Masoneilan, Smart Valve Interface SVI.

Reference may also be made to the applicant's earlier UK patent specification 2,346,672, UK patent specification 2,332,939, and UK patent specification 2,338,051.

Whilst we shall describe the invention with particular reference to emergency valves for use in isolating the flow of oil, it will be understood that other valves controlling the flow of other fluids comprising a liquid or gas may be tested by means according to the invention. The invention may be used in a variety of environments. For example, when the invention is used in a chemical works, the emergency shut down valve or emergency blow-down valve may be used in a chemical pipeline. Similarly the valve may be used in a gas pipeline, either in a chemical works or remotely in a pipeline remote from the works.

One of the difficulties with such emergency valves is that particularly where an oil refinery or oil rig is in continuous operation, the cost of shutting any particular line whilst carrying out maintenance work is extremely high, and, the emergency valves are not moved between maintenance intervals, which may be several years. As a consequence, over that period of time, because of the deposit of dirt or other material, the emergency valve may become stuck and not be operable in an emergency. It is highly desirable to be able to test the emergency valves at more frequent intervals to ensure that they are operable and it is preferable to test for proper operation of the valve and to test for example to determine the degree of deposit of dirt or other material without closing down the oil pipeline in which they are mounted.

Emergency valves comprise a variety of forms, for example, gate valves, butterfly valves, rotary or ball valves. The emergency valve is operated by an actuator. One method of operation of the actuator uses hydraulic or gas pressure to retain the valve in its normal position eg closed or open. In the case of a single acting actuator, when the emergency valve is to be shut (open), the hydraulic or gas pressure is released and a metal spring or other mechanism closes (opens) the valve. In the case of a double acting actuator, the pressure medium controlling the actuator is redirected to close (open) the valve. The application of the hydraulic or gas pressure is normally controlled by one or more electrically controlled solenoid valves, the electrical signal (voltage) being provided by an electrical control line. Any interruption of the electrical signal operates the solenoid valves to release or divert the hydraulic or gas pressure and hence moves the valve to its emergency position ie closed (open).

When testing the operation of an emergency valve, it is common practice for a device to be included in the emergency valve control circuit to be operated in order to test the valve, this has the effect of slowing down the normal operation of the emergency valve. Thus where for example the valve is operated pneumatically, there is provided a proportional controller, which allows the release of successive small amounts of gas/fluid from the actuator, which allows small controlled movements of the actuator. There is also provided a position detector, which detects the position of the valve stem or other part of the valve and which in theory prevents the valve closing completely. (However, in practice, if the emergency valve is stuck, the controller releases gas/fluid until movement is detected by the position detector and may release all or substantially all of the gas at which point if the valve unsticks, it will close completely).

FIGS. 1A–D illustrate the operation of various emergency valves in different circumstances.

In FIG. 1A, the vertical lines illustrate the valve open position and the valve closed position. In normal emergency use, the emergency valve when operated closes in less than one second and there is full valve travel in that period of time.

In FIG. 1B is illustrated the equivalent for the test arrangement described above in which release of successive small amounts of gas or hydraulic fluid allows small movements of the actuator. In this case, the period of time between the valve being fully open and the valve stopped at part travel is greater than 10 seconds and as can be seen the valve travels to an intermediate point between open and closure and then returns to the open position.

FIG. 1C illustrates a situation in which the emergency valve is operated as if there is an emergency condition, so that the valve moves at normal speed (ie the total time from valve open to valve closed would be less than one second) but is stopped at a point before the valve is fully closed as illustrated by the dotted vertical line. In the illustrated example the part valve travel takes place over less than 0.25 seconds.

FIG. 1D illustrates an arrangement similar to FIG. 1C and illustrates in more detail the left hand section of that Figure, whereby there is part valve travel over a time which is less than 0.25 seconds, and the valve is then immediately (without delay) returned from the part open position to the filly open position.

When operating under emergency conditions, an emergency valve evacuates most or all of the gas from the actuator substantially instantaneously and so this known test technique, which slowly releases the gas, does not replicate those conditions. Whilst this test may enable some observation of the operation of the valve and hence some sense of any difficulties there may be in its operation, it is not an accurate test of the operation of the emergency valve in an emergency. Furthermore, only very limited information may be ascertained from the position detector.

We shall describe hereafter an arrangement in which the emergency valve may be tested for operation by partially stroking the valve to a predetermined point and then returned to its normal position, it being ascertained that so long as the emergency valve is shown to move, it is not necessary to close it fully since the initial movement of the valve is only necessary to prove that the valve is free to move and provides evidence that the valve would close completely. We shall also describe, means for comparing operation of the emergency valve during a full emergency closure of the valve assembly with the initial emergency test closure of the valve and thereby to determine its performance.

The present invention provides apparatus for testing an emergency valve and its associated controlling components, said emergency valve comprising a valve member movable during emergency operation by an actuator between a first (normal i.e. open or closed) position and a second (emergency i.e. closed or open respectively) position at a normal operating speed under emergency conditions, said testing apparatus comprising means for initiating emergency operation of the valve so that the valve member begins to move from the first position towards the second position at said normal operating speed and means for immediately initiating reversal of the valve member, when it reaches a position intermediate its first and second positions whereby to partially stroke the valve.

Thus the emergency valve is tested at its normal operating speed and this provides a more accurate indication of the state of the emergency valve than operating it unnaturally slowly.

We shall describe an arrangement in which the partial stroking and hence the testing of the valve is carried out at its normal speed of operation rather than the reduced speed which has hitherto been thought necessary.

Preferably, therefore, we start the emergency procedure for the emergency valve in the normal way and return it before it reaches its emergency position.

Means may be provided to analyse the pressure of said fluid to provide information as to whether the emergency valve is operating satisfactorily. This may include determining whether the valve will close, but may also determine other factors, such as dirt or corrosion which slows operation of the actuator/valve, and may determine whether the solenoid valve or other components linked to the pressure source are operating and may also be used to predict problems in the future.

The time taken for different emergency valves to open or close will vary depending upon their size, material flowing through them, and the actuator driving them, and so to provide for this, in a preferred aspect, the testing apparatus may include a computer, relay means and variable timing means.

Where the emergency valve is of a type where application of an electrical signal to a control line keeps it in its normal position, and an absence of that signal causes it to move to the emergency position by, for example, a spring, said control line is adapted to pass through said testing means from an input terminal to an output terminal, said input terminal and output terminal being connected electrically through relay means and there is provided variable timing means operable to apply power to said normally closed relay to open said relay for a predetermined time to partially close/open the valve.

In many applications, fail safe redundancy is required and in that case a second timing means may be provided in series with said first mentioned timing means, so that even if one of the timing means fails and continues to apply power to said normally closed relay means to keep it open, the other timing means will interrupt the power supply and cause the valve to move to its normal position.

Similarly, said relay means may be coupled in parallel with a second relay means, said second relay means being controlled in the same way as the first relay means by one or two of said timing means, whereby, if either of said relay means fails in said open position, the other relay means will close to electrically connect said input and output terminals and cause the valve to move to its normal position.

In certain circumstances it might be possible to operate said testing means successively in the time interval before said emergency valve has moved fully to its emergency position and in that way successive strokes might cause the emergency valve to move fully to its emergency position. To avoid this, there may be provided a further timing means to interrupt operation of the test for a period of time sufficient for a complete cycle of operation to take place.

One of the merits of using the control line to partially stroke the emergency valve is that there is no interference with the mechanism of the emergency valve and, indeed, the size; type of operation, etc, of the valve is irrelevant. Thus a single type of testing means may be provided for partially stroking any type of emergency valve. It is simply necessary to adjust the variable timing means to suit the relevant emergency valve.

In a particularly preferred aspect of the invention, means may also be provided to analyse the operation of the valve. For example, where the valve is a pneumatically or hydraulically actuated valve, the pressure of the air or hydraulic fluid applied or released (in the case of a single acting actuator) to the actuator of the emergency valve may be measured. We have found that, unexpectedly, from such pressure measurements, the operation of the valve and its operating components may be analysed and problems identified.

In such a way, it is possible to test not only for operation of the actuator/emergency valve assembly, in the sense as to whether the emergency valve will close, but also other factors, such as dirt or corrosion which slows operation of the actuator/emergency valve, whether the solenoid valve or other components linked to the pressure source are operating and which may be used to predict problems in the future.

A preferred embodiment of the invention will now be described by way of example and with reference to the accompanying drawings in which.

Figure 1A:
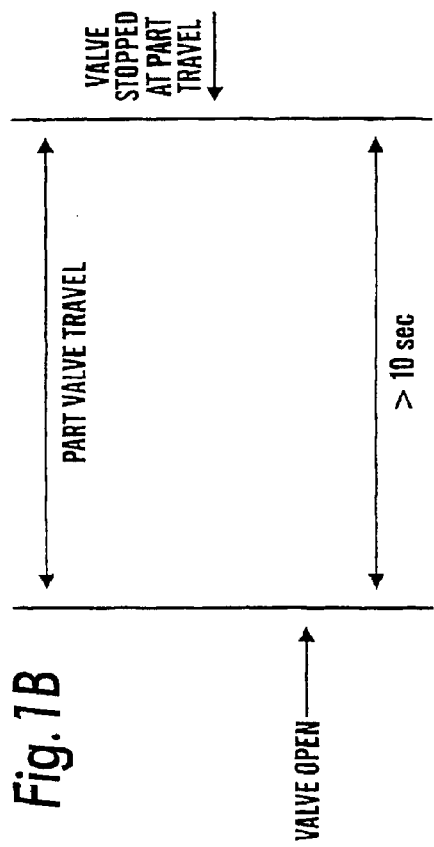
Figure 1B:
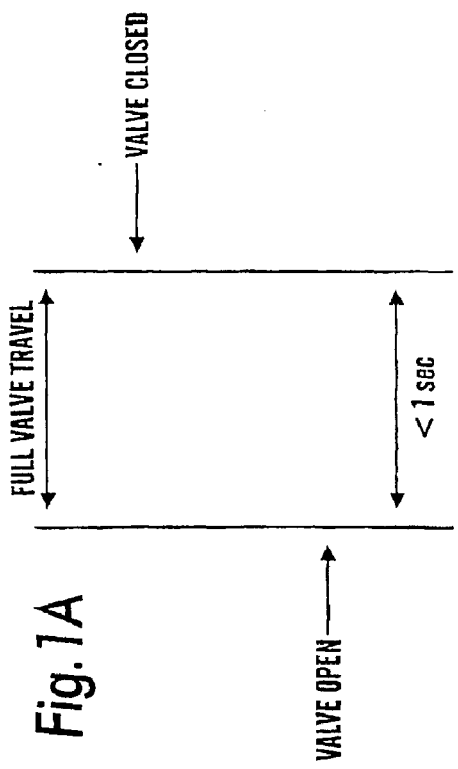
Figure 1C:
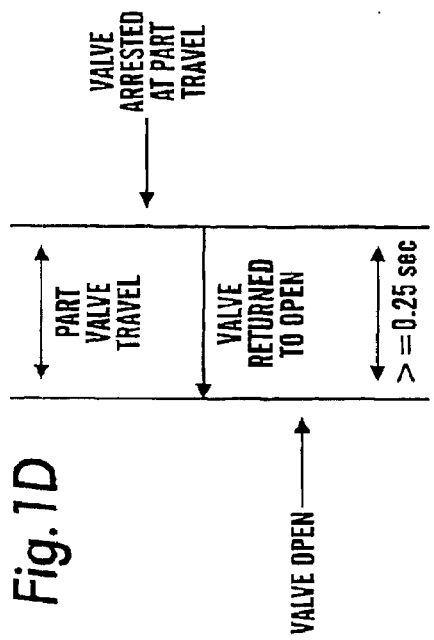
Figure 1D:
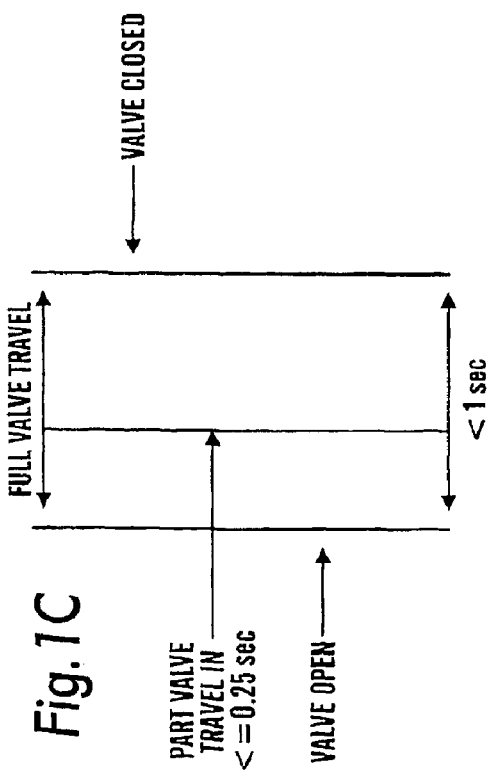
Figure 2:
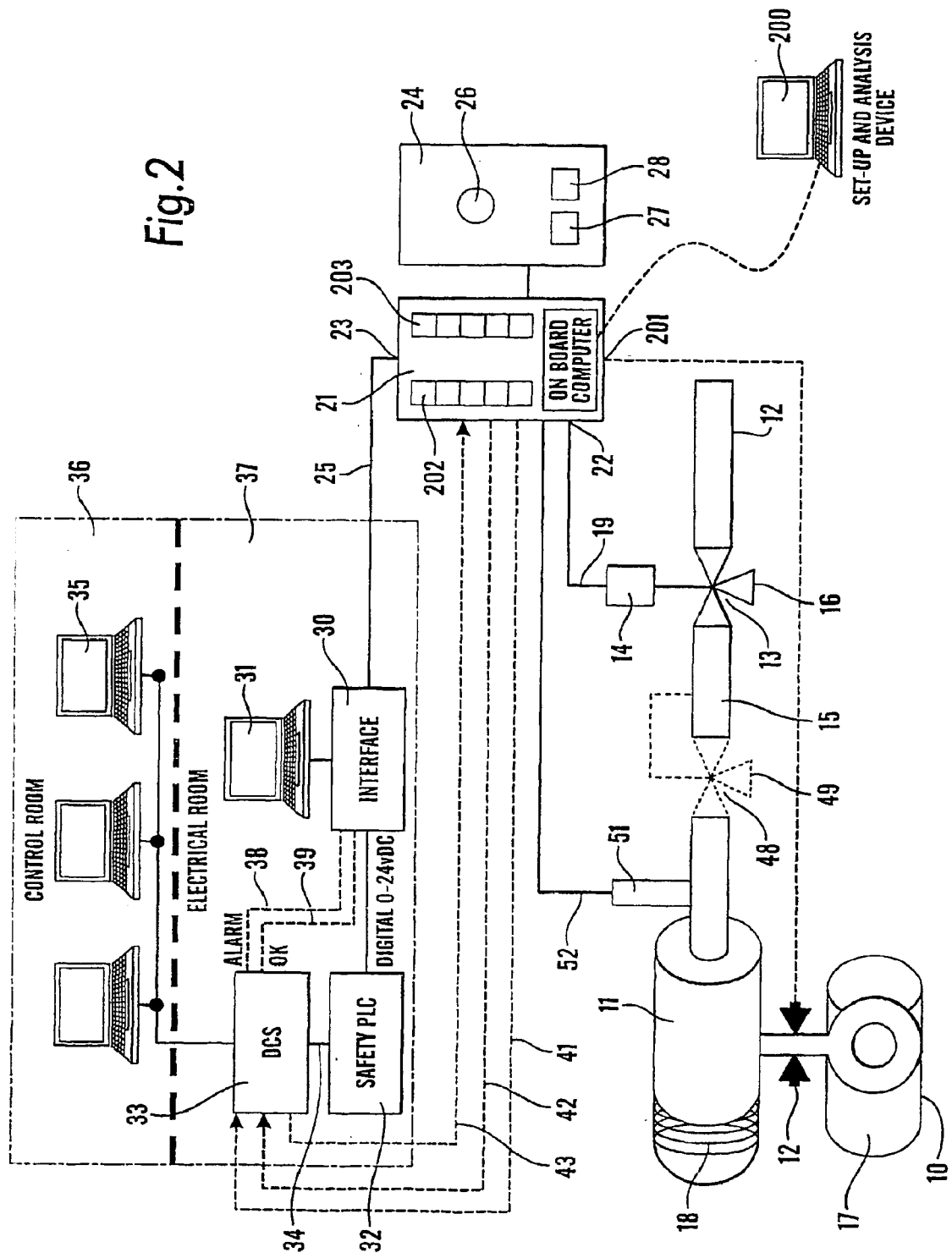
FIG. 2 is a diagrammatic view of an emergency valve in a pipeline with a single hydraulic or pneumatic acting actuator connected to a testing means for partially stroking the emergency valve, the system being shown in a normal condition with the emergency valve open.

Referring to FIG. 2 there is shown an emergency valve 10 in a pipeline 17, the emergency valve being arranged so as to close off the pipeline 17(which may be for example an oil or chemical or gas pipeline) to prevent the flow of fluid through the pipeline in an emergency. The valve 10 is operated by a single acting actuator 11, the actuator being held open by gas or hydraulic fluid applied at pressure to one side of a piston in a piston/cylinder unit of the actuator. The gas or hydraulic pressure fluid from a fluid pressure supply 12 is applied to the actuator 11 via a valve 13 controlled by a solenoid 14 (or other electrically controlled means). The solenoid valve 13, in a first position, applies the pressure from the fluid pressure supply 12 to the piston/cylinder unit of the actuator 11 via a line 15 and in a second position isolates the piston/cylinder unit 11 from the gas or hydraulic pressure supply 12 and connects it to exhaust at 16. In the second position of the solenoid controlled valve 13, with the piston/cylinder unit of the actuator 11 connected to exhaust and in the absence the application of gas or hydraulic pressure to hold the piston of the piston/cylinder unit in such a position as to hold the valve 10 in the open position, the emergency valve 10 immediately moves from its normal position (open in this example) to its closed position by means of a metal spring 18 or other means acting on the rear of the piston of the piston/cylinder unit, the arrangement described above is well known.

The speed of movement of the emergency valve varies depending on the emergency valve. In some emergency valves the operation may be slow and may take a number of seconds from normal (open) to emergency (close) but in many such emergency close valves the operation is rapid and the time from being fully open to fully closed may be as little as one second.

The solenoid valve 13 is held in the position in which pressure from pressure supply 12 is applied to the piston/cylinder unit of the actuator 11 when an electrical voltage is applied on an electrical control line 19 and when the voltage on the electrical control line 19 falls to zero, then the solenoid valve moves to the position in which the piston/cylinder unit is isolated from pressure gas or hydraulic pressure from the supply 12 and connected to exhaust 16. The system is therefore failsafe in that failure of the electrical supply to the solenoid valve, will cause the emergency valve 10 to be closed by the metal spring 18 or other means.

In non fail safe modes the solenoid valve 13 is held in the position in which pressure is applied to the piston/cylinder unit 11 when an electrical voltage is applied on electrical control line 19 and when the voltage on the electrical control line 19 rises, then the solenoid valve moves to the position in which the piston/cylinder unit 11 is isolated from gas or hydraulic pressure from the supply 12.

Referring to FIG. 2 it will be seen that a test control means 21 is provided with an output terminal 22 connected to the line 19 and an input terminal 23 connected to an electrical control line 25, which line 25 is connected to an electrical voltage. The line 25 would normally be connected directly to the solenoid 14 but in this arrangement the test control means 21 has been connected into the line 25/19.

Thus electrical power from the electrical control line 25 passes through the testing control means 21 which controls the application of that electrical power to solenoid valve 14 via line 19.

The control line 25 passes through the testing control means 21 from the input terminal 23 to an output terminal 22, the input terminal and output terminal being connected electrically through relays 203 and there is provided variable timing means 202 to apply power to said relays 203 to open said relays for a predetermined time to interrupt the supply on the line 19 to thereby cause the solenoid valve 13 to exhaust the pressure fluid from the actuator 11 and allow the actuator 11 to move the valve 10 to a partially closed position under the action of spring 18.

Failsafe operation is normally required and thus a second timing means is provided in series with the first timing means so that even if one of the timing means fails and continues to apply power to the normally closed relays to keep it open, the other timing means will interrupt the power supply and cause the emergency valve to move back to its normal position. In certain circumstances it might be possible to operate the test means successively in the time interval before the emergency valve has fully moved to its emergency position and in that way successive attempts to operate the testing control means may cause the emergency valve to fully move to its emergency position. To avoid this there may be provided a further timing means to interrupt operation of the test for a period of time sufficient for a complete cycle of operation to take place.

A test initiation means 24 may be provided connected to the testing control means 21. The test means 24 comprises a start button 26 and an output indicator, which illustrated in the present instance has been provided by two lamps 27 and 28. However other outputs may be provided, for example, a VDU screen to carry a message relating to the fault detected.

The line 25 is connected through an interface 30 (well known in this type of application) which is in turn connected to a computer 31, the power line 25 passing through the interface 30 to a safety programmable logic controller 32. The controller 32 is connected to a distributed control system 33 by line 34 and the distributor control system 33 is connected to computers 35 in a control room 36. The interface 30 computer 31 controller 32 and control system 33 may be provided in a conventional arrangement in an electrical room 37. The DC power is provided on line 25 either directly from the controller 32 or via the interface 30, and through the testing control means 21 to the line 19 and thence to the solenoid 14 of valve 13. As is well known in this field, there may be provided superimposed on the DC signal on line 25 which allows communication between the DCS 33 via the interface 30 and to the testing control means 21. The signals may pass in both directions. Thus the testing control means 21 may provide a signal on the line 25 (as will be explained later) which is extracted by the interface 30. The interface 30 may provide one of two signals, that is an alarm signal on line 38 or an OK signal on the line 39 to the distributed control system 33. Furthermore there may be provided separate signal lines between the testing control means 21 and the control system 33, these lines being illustrated at 41, 42, 43.

We will now describe the set-up and testing procedure.

Set-up Procedure

Figure 3:
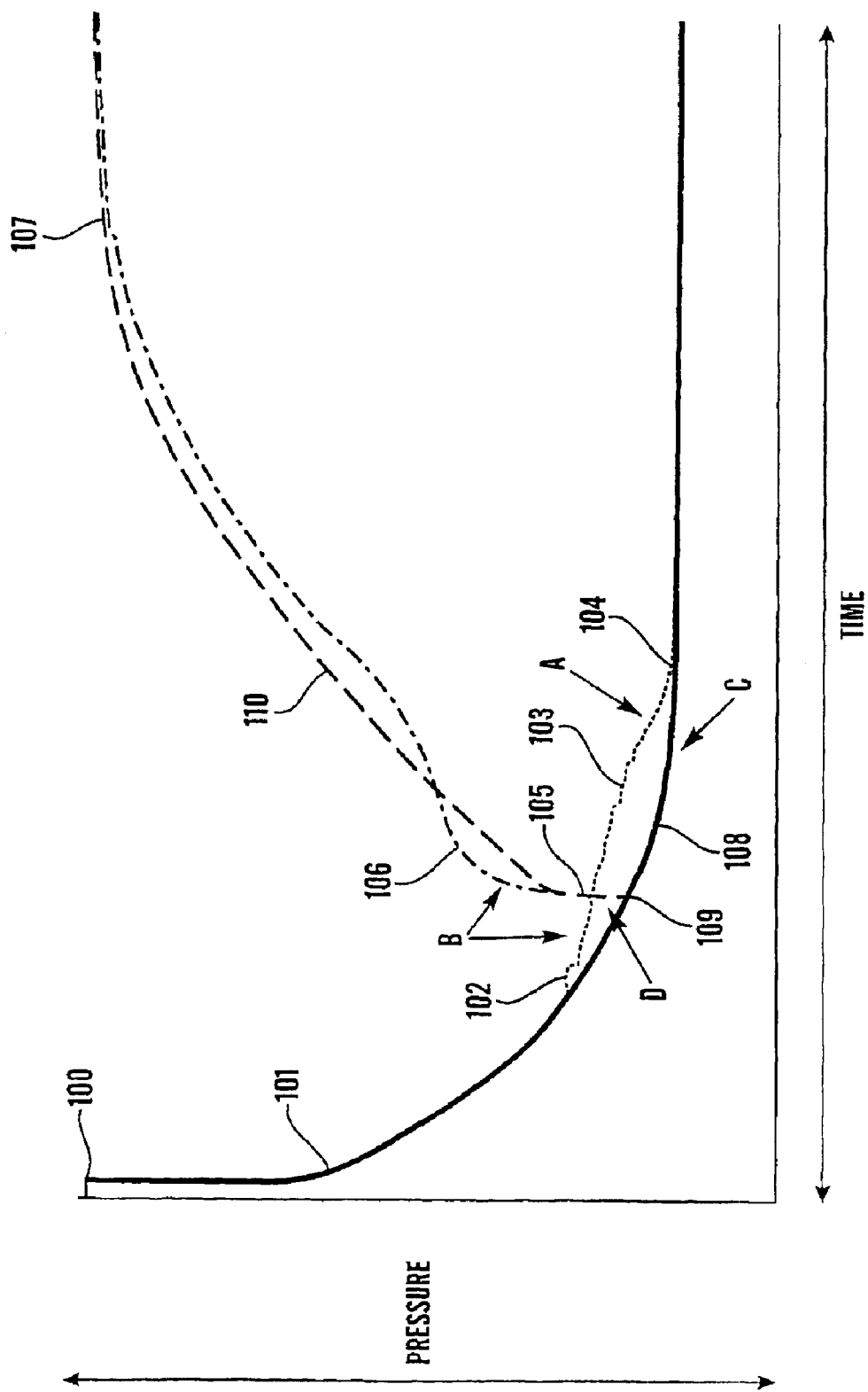
FIG. 3 shows traces of pressure readings taken from a pressure transducer connected to the fluid input/output of the actuator.

The set up procedure may be initiated in a number of ways: from a portable computer device 200 connected to the control means 21, or from a computer 31 via a superimposed signal on control line 25, As described above, the circuitry in device 21, timing 202 and relay means 203 are provided to control the application of the electrical power from the control line 25 via device 21, line 19 thence to solenoid 14 of valve 13 keeping the emergency valve 10 in its normal position When it is desired to set up the emergency valve 10 to define a normal signature A (as shown in FIG. 3) a signal is passed from the portable computer device 200, or from a computer 31 via a superimposed signal on control line 25, The effect of that is to interrupt the relay means and set the timing means 202 at a default long time. The opening of the relay means 203 disconnects the voltage from line 19. As a result in FIG. 2, the solenoid valve 13 will be switched to isolate the pressure supply 12 from the piston cylinder unit of the actuator 11 and the valve 10 will begin to move to its emergency position under the action of spring 18. During this time an output signal is generated and passed from the pressure device 51 on line 52 to the control means 21. Once the pressure has reached atmospheric, and the timing means has timed out, the relay means 203 changes state, which restores the power signal to line 19 and hence to solenoid 14 of valve 16 which reapplies pressure fluid to the actuator and the emergency valve 10 returns to its normal position. In the event that the electrical signal is removed by the safety programmable logic controller 32 this is detected by the circuitry in device 21 and a full stroke close signature is captured using device 51.

The pressure signal A (shown in FIG. 3) produced by the sensor 51 during these processes is stored in an onboard computer 201. An analysis of the signature A will show the change in the pressure applied to the actuator from full system pressure to atmospheric over the time it takes for the emergency valve 10 to fully close.

To produce a partial closure of the emergency valve based on this information, a predetermined percentage closure figure (e.g. 10%, 20%, 30%) is chosen and input into portable computer device 200, or from a computer 31 via a superimposed signal on control line 25, and transmitted to the computer in control means 21. The effect of this is to set the timing means 202 at a new time less than the default time and calculated to provide the predetermined percentage closure figure. The opening of the relay means 203 then disconnects the voltage from line 19. As a result in FIG. 2, the solenoid valve 13 will be switched to isolate the pressure supply 12 from the piston cylinder unit of the actuator 11 and the valve 10 will begin to move to its partial stroke position under the action of spring 18. During this time an output signal is generated and passed from the pressure device 51 on line 52 to the control means 21. Once the timing period is up, the relay means 203 are changes state, which restores the power signal to line 19 and hence to solenoid 14 of valve 16 which reapplies pressure fluid to the actuator and the emergency valve 10 returns to its normal position. The partial stroke signature B (shown in FIG. 3) is then stored as a standard against which further partial stroke tests can be compared.

Test Procedure

The test procedure may be initiated in a number of ways: from the portable computer device 200, or from the computer 31 via a superimposed signal on control line 25, from a signal from the DCS 33 via line 43 or by the push button 26 FIG. 2 in the initiation means.

When, after the signatures A and B have been determined and stored, it is desired to test the emergency valve 10 to compare the signature at a later point in time with the stored signature B, a partial closure test is initiated by a signal from the portable device 200, or from the computer 31 via a superimposed signal on control line 25, from a signal from the DCS 33 via line 43 or by the push button 26 FIG. 2 as described above.

The effect of this is to interrupt the relay means 203 and set the timing means 202 (although in practice the timing means will be preset with the time corresponding to the percentage closure desired). The opening of the relay means 203 disconnects the voltage from line 19. As a result in FIG. 2, the solenoid valve 13 will be switched to isolate the pressure supply 12 from the piston cylinder unit of the actuator 11 and the valve 10 will begin to move to its predefined partial stroke position stored in computer 201 in control means 21 FIG. 2, under the action of spring 18. During this time an output signal is generated and passed from the pressure device 51 on line 52 to the control means 21. Once the timing period set by the timing means to provide the desired partial stroke is reached, the relay means 203 are changes state, which restores the power signal to line 19 and hence to solenoid 14 of valve 16 which reapplies pressure fluid to the actuator and the emergency valve 10 returns to its normal position. The pressure signal produced during this partial stroke test is compared with the signature B by computer 201 of control means 21 FIG. 2, or against previously held data.

Frequent operation of the apparatus to partially move the emergency valve 10 towards its emergency position (ie partially stroke the emergency valve 10) in this way can be used to plot the change of effectiveness of the actuator or its associated equipment to close the emergency valve.

One of the advantages of the arrangement of control means set out above is that it can be simply inserted into the electrical power control line 25/19. This is particularly useful where, for example, the valve 10 is remote, for example, is provided on the seabed and allows ready application of the testing means to other types of emergency control valve, for example, emergency control valves with double acting actuators, or with electrical or Hydraulic actuators.

In many circumstances, the solenoid controlled valve 13, when operated to exhaust the hydraulic or pneumatic pressure from within the actuator 11 is sufficiently large as to exhaust the fluid at a sufficiently rapid rate. In some circumstances, however, particularly where the actuator 11 is large, it may be desirable to provide a larger exhaust outlet than exhaust 16 that the solenoid valve 13 can normally provide. In this case one can use an exhaust valve 48 referred to as a volume booster/quick exhaust valve 48. Such exhaust valves are well known. The exhaust valve 48 is provided in the line 15 adjacent the hydraulic fluids/air inlet/outlet of the actuator 11 and between the actuator 11 and the solenoid valve 13 and includes an exhaust outlet 49. This exhaust outlet 49 may be particularly large. The exhaust valve 48 is operated by means of the pressure differential between the pressure in the pipe work on the two sides of the exhaust valve 48. When the pressure of fluid or gas on the side of the valve 48 closest to the solenoid valve 13 becomes less than the pressure on the opposite side of the valve 48, then the valve 48 opens the actuator 11 to the exhaust 49. Thus, in use, when the solenoid valve 13 opens to exhaust hydraulic fluid/gas from the actuator 11, the pressure in the pipe 15 between the valves 48 and 13 will fall below that on the opposite side of the valve 48 and the valve 48 will immediately open to dump the pressure at a more rapid rate.

FIG. 3 shows various traces of the pressure (detected by pressure sensor 51) exhausting from or being applied to the actuator 11. The vertical axis is of the pressure sensed by pressure sensor 51 and the horizontal axis is time.

The base trace A in FIG. 3, is a trace of the pressure sensed by sensor 51 during a complete emergency operation of the emergency valve. caused by The electrical power is removed from line 19 to solenoid valve 13 for a sufficient time to allow the emergency valve 10 to move to its emergency position; during this process a reading is taken from the pressure transducer 51 FIG. 2. The base trace A is used as a comparison against other tests and provides a basic fill emergency operation pressure signature.

The form of the trace A is therefore as follows: at 100 the electrical signal is removed from solenoid valve 13 and there is an initial rapid pressure decay over region 101 via the solenoid valve 13 and the quick exhaust valve 48 FIG. 2, as air/hydraulic fluid is exhausted from the actuator 11. After a period of time (ie at the end of region 101, at point 102) which may be due to inertia and/or the point at which the pressure in the system reaches a point whereby it cannot hold back the spring 18 in actuator 11, the piston of the piston/cylinder unit of the actuator 11 begins to move. The spring begins to assist the air to exhaust from the actuator and a flattening off or temporary increase of the pressure decay occurs. This provides a "hump" region in the pressure trace at 102. Thereafter the emergency valve moves fully to its emergency position, eg to full closure at 104.

After reapplying power to line 19 to open solenoid valve 13 and repressurise actuator 11 and hence move valve 10 to its normal position, a partial stroking test is carried out to establish a part valve closure base trace B, (indicated by the dash/dot line). Thus the electrical signal on line 19 is removed for a time allowing the emergency valve 10 to begin moving to its emergency position., and as already explained after a predetermined time controlled by timing means, the electrical signal to solenoid valve 13 FIG. 2 is reinstated, to allowing the system pressure to pressurise the actuator 11 and return the valve 10 to its normal position.

Referring to the trace B shown in FIG. 3, initially when the electrical signal is removed from the solenoid valve 13 at 100 there is the same initial rapid pressure decay at region 102 as in the case of trace A. As in the case of trace A, once pressure in the system reaches a point 102 the pressure trace initially follows trace A along region 103.

At the point 105, the timing means operate the relay means to reapply power to line 19 and hence to the solenoid valve 13 which moves to reapply system pressure to the actuator 11 and so the pressure trace B begins to increase along the line at region 106. Approximately at point 107, the pressure equals the initial pressure.

The partial stroking base trace B is used as a comparison against other tests and provides a partial test signature.

Should the emergency valve or its associated control equipment develop a fault it has been found that an abnormal trace is provided by the pressure transducer 51. The trace C illustrates the pressure signal provided by the pressure sensor where the emergency valve exhibits a first fault. Trace C illustrates the situation where the piston of the piston cylinder unit of the actuator 11 does not move when pressure is released from the actuator 11. Thus if the piston remains stuck in the normal, non emergency position, (or even if it only moves slowly or slightly) then initially as can be seen the pressure trace C follows the rapid pressure decay 100, 101, 102 of pressure trace A. Beyond point 102 the pressure trace continues downwards in a continuous manner 108 (ie there is no "hump" 103) to the point 104 where all of the air or hydraulic pressure within the actuator is exhausted.

Trace D shows the pressure signal for a partial stroke test where the piston is stuck. Pressure trace D follows that of pressure trace C between 100, 101, 102 and 108, ie does not include the "hump" of pressure trace A but continues downwards like pressure trace C until the solenoid valve 13 is actuated at 109 to reapply pressure to the actuator 11 at which point the pressure trace increases as shown at 110.

It will be noted that the area of the trace including the points 102, 103, 105, 108, 109 is particularly relevant to an analysis of problems associated with the emergency valve and its actuator, Similarly the area of trace from 100 to 102 may be used to identify problems associated with the emergency valves control means such as the solenoid valve and or the quick exhaust/volume booster.

As is clear from FIG. 2, the pressure signal is passed along line 52 to the test control means 21 the signal is analysed by test control means 21 by means of computer 201 and passes the relevant signal to the unit 24 where an error may be indicated by illumination of the lamps 27 and 28. Thus if the problem associated with the emergency valve is of a relatively minor nature (for example, the piston moves slightly more slowly than usual and hence, for example, the "hump" 103 will be slightly different from the base trace B, then a combination of lamps may be illuminated. If, however, there is a more serious problem, for example the piston is stuck and therefore trace D is detected, then a second lamp 28 may be illuminated to indicate that immediate action is required. Similarly the relevant information may be passed along line 25 to the DCS 33 (to provide a signal on line 38) or alternatively along line 42 or 41 to the DCS 33.

We have illustrated two traces C and D which indicate errors in operation of the emergency valve. Other traces which indicate other problems may be determined and sample traces may be stored on a remote website for access over the Internet by users of emergency valves. Thus the user of an emergency valve may download from time to time from the website a suite of traces illustrating various problems which, perhaps, have been encountered in use by other users of emergency valves, and may use these traces to analyse the traces provided by the relevant emergency valve during a partial stroking test.

The suite of traces may include traces which illustrate problems associated with dirt or corrosion which slows movement of the valve 10, whether the solenoid 14 or components linked to the pressure source 12 are operating correctly.

Additional diagnostics are be obtainable by downloading to a portable data storage device 200, for analysis by a computer housing a diagnostics program, the data obtained from and stored in the computer memory in by means of local infrared source, or by a superimposed signal on line 25.

What is claimed is:

1. Apparatus for testing an emergency valve and its associated controlling components, said emergency valve comprising a valve member (10) movable during emergency operation by an actuator (11) between a first and a second position at a normal operating speed under emergency conditions, said testing apparatus comprising means for initiating operation of the valve at emergency speed so that the valve member begins to move from the first position towards the second position at emergency speed and means (14,13) for initiating reversal of the valve member when it reaches a position intermediate its first and second positions whereby to partially stroke the valve, said actuator being operated by fluid, characterized in that said apparatus including means (21,51) to measure a parameter of the fluid applied to or exhausted from the actuator of the valve and/or associated controlling devices in the pipe-work connected to the actuator, and means (21) is provided to analyse said parameter to thereby provide information as to whether the emergency valve and/or associated controlling devices in the pipe-work connected to the actuator are operating satisfactorily, said means to analyse including stored data relating to the parameter recorded during an initial test operation of the emergency valve, and the means to analyse is adapted to compare the data measured during a subsequent test with the stored data.

2. Apparatus as claimed in claim 1 in which the parameter is the pressure of fluid applied to or exhausted from the actuator of the valve and/or associated controlling devices in the pipe-work connected to the actuator.

3. Apparatus as claimed in claim 1 in which the parameter is the flow of fluid applied to or exhausted from the actuator of the valve and/or associated controlling devices in the pipe-work connected to the actuator.

4. Apparatus as claimed in claim 1 including means for comparing operation of the emergency valve (17) and/or associated controlling devices in the pipe-work connected to the actuator during the partial stroking of the valve with an initial test operation of the valve at emergency speed and thereby to determine its performance.

5. Apparatus as claimed in claim 4 further including means for comparing operation of the emergency valve (17) and/or associated controlling devices in the pipe-work connected to the actuator during a full operation of the valve with the initial full operation test of the valve at emergency speed and thereby to determine its performance.

6. Apparatus for partially stroking an emergency valve of the type controlled by an electrical signal on a control line, said emergency valve being operable by an actuator operated by fluid, said apparatus comprising testing means (21,202,203,201) for connection to said control line said testing means including means for removing the electrical signal on said control line (13,14) for a period of time to cause said emergency valve to initiate emergency operation of the valve at its normal emergency speed to move to a position intermediate an open and a closed position and for then reapplying the electrical signal to reverse the valve, characterized in that said apparatus including means (21,51) to measure a parameter of the fluid applied to or exhausted from the actuator of the valve and/or associated controlling devices in the pipe-work connected to the actuator, and means (21) is provided to analyse said parameter to thereby provide information as to whether the emergency valve and/or associated controlling devices in the pipe-work connected to the actuator are operating satisfactorily, said means to analyse including stored data relating to the parameter recorded during an initial test operation, and the means to analyse compares the data measured during a subsequent test with the stored data.

7. Apparatus as claimed in claim 6 in which, the testing means includes at least one variable timing means and a relay means.

8. Apparatus as claimed in claim 6 in which the valve is operated by an actuator which is operated by fluid pressure, said apparatus including means (21,51) to measure the pressure of fluid exhausted from or applied to the actuator and/or associated controlling devices in pipe-work connected to the actuator.

9. Apparatus as claimed in claim 6 in which the valve is operated by an actuator which is operated by fluid, said apparatus including means (21,51) to measure the flow of fluid applied to or exhausted from or applied to the actuator of the valve and/or associated controlling devices in pipe-work connected to the actuator.

10. Apparatus as claimed in claim 6 including means for comparing operation of the emergency valve (17) during the partial stroking closure of the valve assembly with an initial test closure of the valve at emergency speed and thereby to determine its performance.

11. Apparatus as claimed in claim 10 further including means for comparing operation of the emergency valve (17) during a full emergency closure of the valve assembly with the initial test closure of the valve at emergency speed and thereby to determine its performance.

12. Apparatus as claimed in claim 6 in which the emergency valve includes means whereby application of said electrical signal on said control line keeps the emergency valve open, and an absence of that signal causes it to be closed by a resilient means, said control line passing through said testing means from an input terminal to an output terminal, said input terminal and output terminal being connected electrically through a normally closed relay (203).

13. Apparatus as claimed in claim 12 in which there is provided timer means (21,202) operable to apply power to the control terminal of said normally closed relay (203) to open said relay to partially close/open the emergency valve.

14. Apparatus as claimed in claim 13 in which timer means includes two timers (202) in series, so that even if one of the timer fails and continues to apply power to said normally closed relay (203) to keep it open, the other timer will interrupt the power supply.

15. Apparatus as claimed in claim 14 in which said relay means (203) is coupled in parallel with a second relay means (203), said second relay means having a control terminal connected to the control terminal of said first relay (203), whereby, if either of said relay means fails in said open position, the other relay means will close to electrically connect said input and output terminals.

16. Apparatus as claimed in claim 14 in which there is provided a further timer means (202) to interrupt operation of (13) for a period of time sufficient for the emergency valve to return to its open position after partial closure.

17. Apparatus for stroking an emergency valve, at its designated operating speed under emergency conditions, of the type controlled by an electrical signal on a control line (19), said emergency valve being operable by an actuator operated by fluid, said apparatus comprising means (21,202, 203,201) for connection to said control line, to provide a means of removing the electrical signal to means (13,14) for a period of time to cause said emergency valve to move from its open to closed position and then to be reversed characterized in that said apparatus including means (21,51) to measure a parameter of the fluid applied to or exhausted from the actuator of the valve and/or associated controlling devices in the pipe-work connected to the actuator, and means (21) is provided to analyse said parameter to thereby provide information as to whether the emergency valve and/or associated controlling devices in the pipe-work connected to the actuator are operating satisfactorily, said means to analyse including stored data relating to the parameter recorded during an initial test operation, and the means to analyse compares the data measured during a subsequent test with the stored data.

* * * * *